No. 857,219. PATENTED JUNE 18, 1907.
J. R. WELCH.
VEHICLE WHEEL.
APPLICATION FILED JAN. 20, 1906.

2 SHEETS—SHEET 2.

Witnesses:
A. L. Lord
C. McElroy

Inventor
John R. Welch
By Fouts & Hull
Attorneys.

UNITED STATES PATENT OFFICE.

JOHN R. WELCH, OF ALEXANDRIA, INDIANA.

VEHICLE-WHEEL.

No. 857,219. Specification of Letters Patent. Patented June 18, 1907.

Application filed January 20, 1906. Serial No. 296,966.

*To all whom it may concern:*

Be it known that I, JOHN R. WELCH, residing at Alexandria, in the county of Madison and State of Indiana, have invented a certain new and useful Improvement in Vehicle-Wheels, of which the following is a full, clear, and exact description, reference being had to the accompanying drawings.

My invention relates to vehicle wheels in general, but more especially to wheels for automobiles, and has for its object to provide a wheel of novel construction whereby a tire other than a pneumatic tire may be employed without the sacrifice of the resiliency and ease of riding which are characteristic of the latter tire.

Generally speaking, the invention may be defined as consisting of the combinations of elements embodied in the claims hereto annexed.

Figure 1:
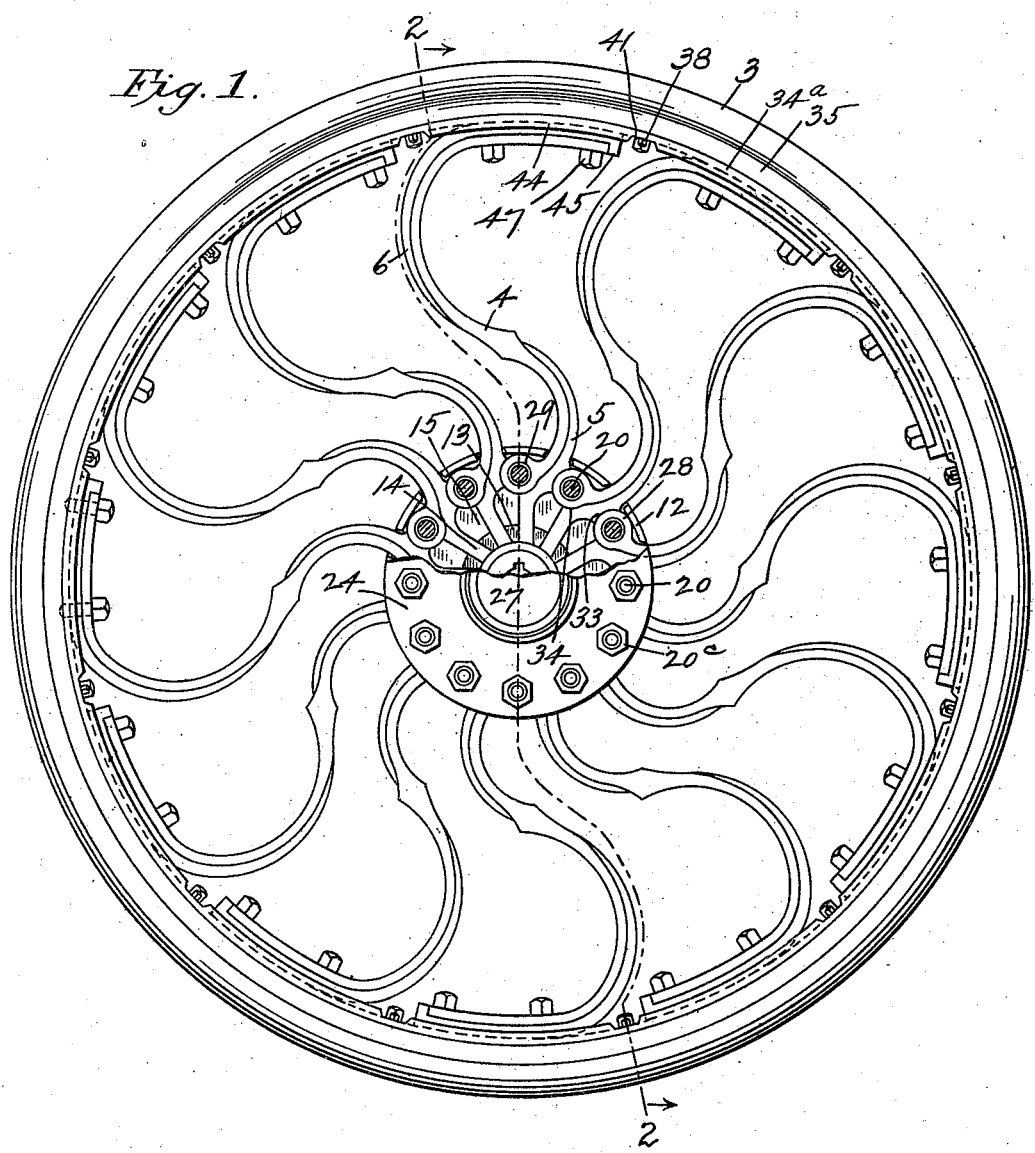
Figure 2:
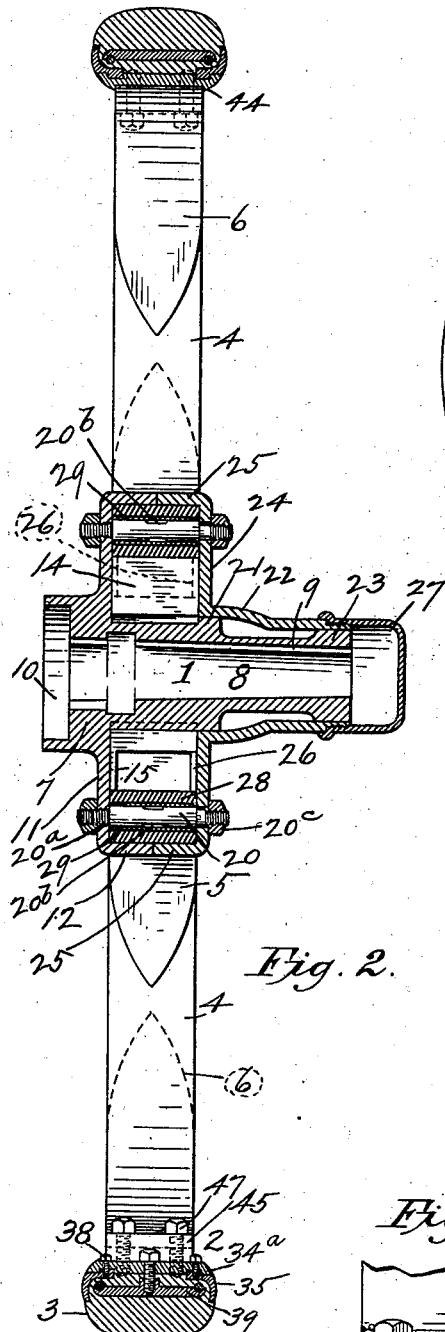
Figure 3:
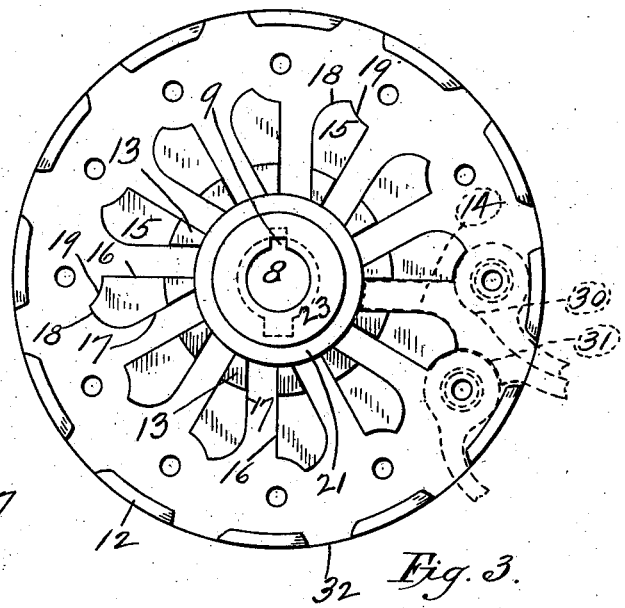
Figure 4:
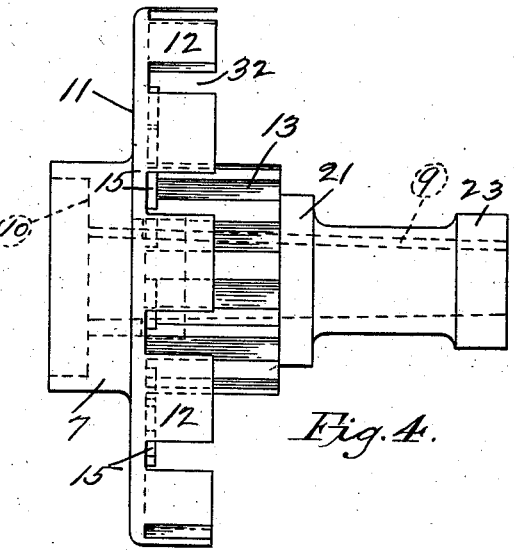
Figure 5:
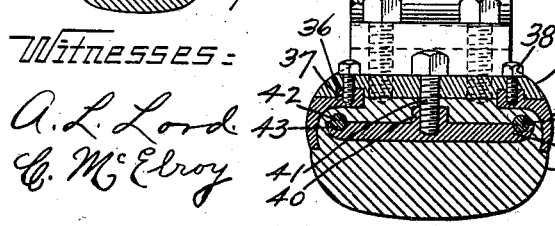

Referring to the drawings:—Figure 1 represents an elevation of a vehicle wheel constructed in accordance with my invention, the outer face plate being broken away to illustrate the manner in which the spokes are secured in place; Fig. 2 represents an enlarged sectional view taken on the line 2—2 of Fig. 1; Fig. 3 represents a front elevation of the hub, the front plate and dust cap being removed and certain parts of the spokes being represented in dotted lines; Fig. 4 represents a side elevation of the hub shown in Fig. 3; and Fig. 5 represents an enlarged sectional detail of the tire and rim.

The wheel comprises the hub 1, rim 2, tire 3 and spokes 4 extending between said hub and rim. As will appear from the drawings, particularly from Fig. 5, the tire which I preferably employ is a solid rubber tire and, in order to obtain the requisite resiliency, I interpose between the tire and the hub the spokes 4 which are preferably of spring steel, and are reversely curved, the spokes resembling in general outline the letter S. With each of these spokes, I employ an inner leaf spring 5 and an outer leaf spring 6, the former engaging the convex surface of the inner curved portion of the spoke 4 and the latter engaging the convex surface of the outer curved portion of said spoke. The springs 5 and 6 are given a curvature slightly greater than that of the corresponding surfaces of the spokes 4 which they engage, whereby said springs resist the yielding of the spokes under compression. The outer end of a spring 5 is nearly opposite the inner end of a spring 6, the portion of the spoke 4 intermediate between such extremities of the springs being thickened, as appears in Fig. 1, to compensate for the lack of reinforcement at this point.

To accommodate the inner ends of the spokes 4 and springs 5, I provide a special construction of hub. This hub comprises the inner casting or barrel 7, provided with a central bore 8 for application to the spindles of vehicle axles. In the case of an automobile, the hubs of the rear or drive wheels will be each provided with a keyway 9, whereby they may be splined onto their respective spindles. The inner end of the casting or barrel is recessed at 10, for engagement with the ordinary shoulder on the axle, and is also provided with a flange or face plate 11 projecting outwardly a considerable distance from the central portion of the hub, the end of the plate being bent at right angles to the body thereof, to form a flange 12. The barrel of the hub casting is provided with a suitable number (depending upon the number of spokes to be used) of radially extending ribs 13. As will appear more particularly from Figs. 2 and 4, these ribs project a relatively short distance from the central portion of the barrel of the hub casting to receive between them the inner ends 14 of the springs 5. At its base each rib is extended by means of a boss 15, preferably integral with the rib and the plate 11. One face 16 of each rib 13 and boss 15 is straight or plane and is in the plane of a radius drawn from the center of the hub, as will appear more particularly from Fig. 3. The reverse face 17 of each rib 13 and boss 15 is also straight for a portion of its length, but is substantially parallel with the adjacent radial face 16 of the next rib. At its outer portion, the boss 15 is curved at 18 toward the face 16 and said faces 16 and 18 are united by a concave face 19, the curvature of which corresponds to an arc described from the center of the pivot pin 20. This pivot pin 20 is for the inner end of a spoke 4, and will be described hereinafter more fully in connection therewith. Outside of the ribs 13, the hub barrel is provided with a short circular flange 21.

22 designates a sleeve of a size to be slipped over the outer end of the hub casting, its outer end fitting closely around the enlarged outer end 23 of said casting and its inner end being enlarged to slip over the circular flange 21. Preferably integral with said sleeve 22 is a flange or face plate 24 corresponding to the plate 11 on the hub and having an inturned end flange 25 corresponding to the flange 12. The inner face of the plate 24 is provided with bosses 26, corresponding in shape, size, and position to the bosses 15 on the hub flange 11.

27 designates a dust cap which may be threaded onto the outer end 23 of the hub casting.

The inner end of each spoke is enlarged into a cylindrical hub 28 adapted to be fitted over a pin 20, a bushing 29 being provided between said pin and hub. The inner ends of the springs 5 are so shaped as to be inserted between adjacent ribs 13 and bosses 15, being concaved or rounded out at 30 and 31 to engage the inner cylindrical ends of the adjacent spokes, and the flanges 12 and 25 are provided with recesses for the reception of the spokes 4 and springs 5. The recesses in the flange 12 are shown at 32, Figs. 3 and 4, and said recesses are enlarged inwardly and are rounded, as shown more particularly in Figs. 1 and 3, to correspond to the contour of the adjacent faces of the spokes 4 and springs 5. As the recesses in the flange 25 are identical in construction with those in the flange 12, no view of the latter will be necessary other than Fig. 1.

In assembling, the pins 20 are adjusted so that the inner shoulders 20ª thereof will engage the inner face of the plate 11, said pins being provided with wrench-receiving surfaces 20ᵇ for the purpose of so adjusting them. The inner ends of the spokes are applied to the pivot pins and the springs 5 are inserted in place, after which the sleeve 22 and plate 24 are slipped over the end of the hub casting with the bosses 26 opposite the bosses 15, and the nuts 20ᶜ are then tightened to draw the parts 11 and 24 together. The length of the flanges 12 and 25 and ribs 13 and the width of the inner ends of the spokes 4 and springs 5 are such that, when the nuts 20ᶜ are tightened, the flanges 12 and 25 are in contact and the inner ends of the springs are engaged by the ribs 13 and bosses 15 and 26. As will appear more particularly from Fig. 1, the inner portion of each spring 5 is rounded or concaved at 33 and 34 to engage and conform to the cylindrical inner ends of the spokes 4 between which each of said springs is inserted.

The form of rim which I preferably employ with my wheel is shown in Figs. 2 and 5 and consists generally of an inner rim portion 34ª, preferably of steel, and a pair of detachable side flanges 35 of the same material. The inner rim member and the flanges are conveniently assembled by providing the outer face of the former with an angular recess 36 at a short distance within each outer edge thereof, said recess being adapted to receive a corresponding angular projection 37 on the inner surface of the flange. The member 34ª and flanges 35 are secured together, as by screw bolts 38 extending through 34ª and into the projection 37 on the flange. When assembled, the contour of the outer surface of the rim and flanges is such as to provide a continuous unbroken convex exterior surface.

To secure the tire in place on the rim, I may embed within the former a series of plates 39 each having one or more central projections 40 for the reception of a screw bolt 41, whereby the tire may be firmly secured to the rim. In the case of a tire having wires 42 therein, the plates will be provided with corresponding grooves 43 for the reception of such wires. By the engagement of the wires by the plates, the tightening of the screw bolts 41 will more effectively secure the tire to the rim.

In Figs. 1 and 2, there is shown the manner of securing the spokes to the rim. The inner member of the rim is provided with upwardly extending side flanges 44. The lower ends of the springs are flattened, being given a curvature corresponding to that of the inner face of the rim member 34ª to provide an elongated bearing thereon, and the extreme end of each spring is turned upwardly at 45 to provide a stop or abutment for the end of the spoke 4, the lower portion of the spoke being also curved to form an extended bearing on the lower end portion of the spring 6. Screw bolts 47 secure the lower ends of the springs and spokes together and to the rim.

The result of the construction hereinbefore described is to increase the resiliency of the solid rubber tire by the resiliency of the spokes 4 and springs 5 and 6. The peculiar shape of the spokes contributes to this result, while the provision of the springs 5 and 6, which are so shaped as to resist the compression of the spokes, provides a construction which will, for a minimum weight of material, secure the necessary resiliency without too much distortion of the wheel and rim. The providing of the rounded surfaces 33 and 34 on the inner spring members permits a slight rotation of the spokes on their pivots, thereby obviating the danger of breaking the spokes when the tire strikes an obstruction. Furthermore, the construction of the hub and of the rim permits of the rapid assembling of the wheel.

It will be obvious that numerous changes may be made in the details of the embodiment of my invention herein disclosed without departing from the spirit of the invention. For instance, the portions of the hub which are formed integral with each other may be made separable without sacrificing all of the advantages of the invention, and numerous other changes will suggest themselves to the skilled mechanic. I therefore do not propose to limit myself to such details of construction except as the same may be included in the claims hereto annexed or rendered necessary by the prior state of the art.

Having thus described my invention what I claim as new and desire to secure by Letters Patent is:—

1. In a vehicle wheel, the combination of a hub and a rim, a series of spokes having their inner ends operatively connected to said hub and their outer ends curved toward said rim, and a leaf spring for each of said spokes, each of said springs being provided with a stop for engagement by the outer extremity of a spoke and being curved to correspond to the curvature of the spoke to reinforce the same, and means for securing said spokes and springs to the rim, substantially as specified.

2. In a vehicle wheel, the combination of a hub and a rim, of a series of spokes extending between said hub and rim, each of said spokes being reversely curved, and a pair of reinforcing springs for each of said spokes, each of said springs being adapted to engage and reinforce the convex surfaces of said spoke, substantially as specified.

3. In a vehicle wheel, the combination of a rim and a hub, spokes operatively connected to said hub and rim, each of said spokes having its inner portion curved in one direction and its outer portion curved in the opposite direction, a leaf spring operatively connected to the hub and engaging the adjacent inner convex surface of the spoke, and a spring operatively secured to the rim and engaging the adjacent outer convex surface of said spoke, substantially as specified.

4. In a vehicle wheel, the combination of a hub and a rim, spokes operatively connecting said hub and rim, each of said spokes having an inner curved portion and a reversely curved outer portion, and a pair of curved springs for each of said spokes, one spring being secured to the hub and the other to the rim, the spoke having its intermediate unreinforced portion of greater cross-sectional area than the other portions thereof, substantially as specified.

5. In a vehicle wheel, the combination of a rim and a hub, said hub having a series of ribs projecting radially therefrom, spokes having their outer ends operatively connected to said rim and their inner ends operatively connected to said hub, and reinforcing springs for the inner portions of said spokes, each of said springs having an inner end adapted to fit between a pair of said ribs, substantially as specified.

6. In a vehicle wheel, the combination of a rim and a hub, the hub being provided with a series of ribs projecting from the barrel thereof, of a series of resilient spokes operatively connecting said rim and hub, and a series of reinforcing springs for the inner portions of said spokes, each of said springs being provided with an inner portion adapted to fit between a pair of said ribs and an exterior portion adapted to engage and reinforce the spoke, substantially as specified.

7. In a vehicle wheel, the combination of a rim and a hub, spokes operatively connecting said rim and hub, each of said spokes being provided with a curved portion adjacent to the inner end thereof, ribs projecting outwardly from the barrel of the hub, and a series of reinforcing springs having their inner ends fitted between said ribs and each having a curved portion adapted to engage and reinforce the inner curved portion of a spoke, substantially as specified.

8. In a vehicle wheel, the combination of a rim and a hub, said hub being provided with ribs projecting outwardly from the barrel thereof, a plurality of resilient spokes operatively connecting said rim and hub, the inner end portions of said spokes being curved and being connected to said hub beyond the outer ends of said ribs, and reinforcing springs having their inner ends fitted between said ribs and their outer portions curved to engage and reinforce the inner curved portions of said spokes, substantially as specified.

9. In a vehicle wheel, the combination of a hub and a rim, of a series of spokes having their inner ends curved and provided with cylindrical bearings, pivots for said bearings carried by said hub, and a series of reinforcing springs having their inner ends projecting inwardly beyond said bearings, each of said springs being provided with concave portions adapted to engage said bearings and with an outer curved portion adapted to engage the correspondingly curved inner portion of a spoke to reinforce the same, substantially as specified.

10. In a vehicle wheel, the combination of a rim and a hub, said hub being provided with oppositely-located face plates and a flange located between said face plates and provided with recesses for the reception of the inner ends of the spokes, the opposite walls of each of said recesses diverging inwardly, spokes operatively connecting said hub and rim and having their inner ends curved and connected to said hub between the recesses, and a reinforcing spring for each of said spokes having its inner end secured to the hub and its outer end projecting through a recess and engaging the convex curved surface of a spoke, substantially as specified.

11. In a vehicle wheel, the combination of a rim and a hub, said hub comprising oppositely-located face plates and flanges extending between said face plates and provided with recesses for the reception of the inner ends of the spokes, pins extending between said plates between said recesses, spokes having their outer ends operatively connected to said rim and their inner ends curved and provided with cylindrical bearings for said pins, a reinforcing spring for the inner curved portion of each of said spokes, said spring being provided with concave surfaces adapted to fit the cylindrical bearings of adjacent spokes and also having a curved outer portion for engagement with the corresponding curved portion of a spoke, the width of each of said recesses being slightly greater than the combined widths of the adjacent portions of a spring and spoke, substantially as specified.

12. In a vehicle wheel, the combination of a rim and a hub, said hub comprising oppositely located face plates and flanges extending between said face plates and provided with recesses for the reception of the inner ends of the spokes, the opposite walls of each recess diverging inwardly, pins extending between said plates between said recesses, spokes having their outer ends operatively connected to said rim and their inner ends curved and provided with cylindrical bearings for said pins, a reinforcing spring for the inner curved portion of each spoke, said spring being provided with concave surfaces adapted to fit the cylindrical bearings of adjacent spokes and also having a curved outer portion for engagement with the corresponding curved portion of a spoke, the width of each recess being greater than the combined widths of the adjacent portions of a spring and spoke, substantially as specified.

13. In a vehicle wheel, the combination of a hub and a rim, said hub comprising a fixed and a removable face plate, ribs projecting outwardly from the barrel of the hub, said ribs being of a length to space said face plates apart and each of said ribs being provided with a boss, corresponding bosses on the removable face plate, spokes operatively connected to said rim and having their inner ends connected to said hub outside of the ends of such bosses, and reinforcing springs for the inner ends of said spokes, the inner ends of said springs being adapted to fit between the adjacent ribs and the bosses on said ribs and the removable face plate, the outer portions of said springs engaging the inner portions of said spokes to reinforce the same, substantially as specified.

14. In a vehicle wheel, the combination of a hub and a rim, said hub comprising a fixed and a removable face plate, spokes operatively connected to said face plates and said rim, ribs projecting outwardly from the barrel of the hub, the length of said ribs being as great as the width of the inner ends of the spokes, bosses for said ribs being provided on said face plates, reinforcing springs having their inner ends inserted between said ribs and bosses and their outer portions engaging the spokes to reinforce the same, substantially as specified.

15. In a vehicle wheel, the combination of a rim and a hub, said hub being provided with oppositely-located face plates, each of said plates being provided with a flange having recesses therein for the reception of the inner ends of the spokes, ribs projecting from the barrel of the hub and serving, with said flanges, to space the face plates apart, spokes operatively connected to said rim and having their inner ends extending through said recesses, and reinforcing members for said spokes having their inner ends fitted between said ribs and their outer ends projecting through said recesses and engaging said spokes, substantially as specified.

16. In a vehicle wheel, the combination of a rim and a hub, a series of reversely-curved spokes extending between said rim and hub, and a pair of reinforcing springs for each of said spokes, one of said springs being secured to the rim and engaging the adjacent convex surface of the spoke and being substantially coextensive with such surface and the other spring being secured to the hub and engaging the adjacent convex surface of the spoke and being substantially coextensive with such surface.

17. In a vehicle wheel, the combination of a rim and a hub, a series of spokes extending therebetween, said spokes having their outer end portions curved to conform to the curvature of the rim and the portions adjacent to said end portions curved away from the rim, and a reinforcing leaf spring for each of said spokes, each of said springs being secured to said rim and conforming in shape to the end portion of the spoke and engaging the curved portion of the spoke adjacent to the rim, each of said springs being provided with a stop at the outer end thereof for the corresponding end of the spoke, and means for securing said spokes and springs to the rim.

18. In a vehicle wheel, the combination of a rim and a hub, a series of reversely curved spokes extending between said rim and hub, and a pair of reinforcing springs for each of said spokes, one of said springs being secured to the rim and engaging the adjacent convex surface of the spoke and being substantially coextensive with such surface and the other spring being secured to the hub and engaging the adjacent convex surface of the spoke and being substantially coextensive with such surface, each of said springs having a greater curvature than that of the corresponding surface of the spoke.

In testimony whereof I affix my signature in the presence of two witnesses.

JOHN R. WELCH.

Witnesses:
JOSEPH E. JEFFRIES,
WILLIAM F. STINSON.